(12) United States Patent
Cleveland et al.

(10) Patent No.: US 8,279,796 B1
(45) Date of Patent: Oct. 2, 2012

(54) MULTIPLE-CHANNEL SOFTWARE DEFINED RADIOS AND SYSTEMS USING THE SAME

(75) Inventors: John F. Cleveland, Edmonds, WA (US); Thomas G. Donich, Seeley Lake, MT (US)

(73) Assignee: BNSF Railway Company, Fort Worth, TX (US)

( * ) Notice: Subject to any disclaimer, the term of this patent is extended or adjusted under 35 U.S.C. 154(b) by 1355 days.

(21) Appl. No.: 11/985,764

(22) Filed: Nov. 16, 2007

(51) Int. Cl.
*H04B 7/204* (2006.01)
*H04W 74/00* (2009.01)
*H04L 27/00* (2006.01)
*H03D 3/18* (2006.01)

(52) U.S. Cl. ............ 370/319; 455/103; 455/189.1; 455/553.1

(58) Field of Classification Search ............ 375/326; 455/418; 711/101; 710/100
See application file for complete search history.

(56) References Cited

U.S. PATENT DOCUMENTS

| | | | |
|---|---|---|---|
| 5,222,250 A * | 6/1993 | Cleveland et al. | 455/47 |
| 5,671,400 A * | 9/1997 | Kiggens et al. | 703/23 |
| 6,072,994 A * | 6/2000 | Phillips et al. | 455/84 |
| 6,081,566 A * | 6/2000 | Molnar et al. | 375/347 |
| 6,151,354 A * | 11/2000 | Abbey | 375/211 |
| 6,185,418 B1 * | 2/2001 | MacLellan et al. | 455/418 |
| 6,389,069 B1 * | 5/2002 | Mathe | 375/232 |
| 6,919,950 B2 * | 7/2005 | Dabrowski et al. | 349/174 |
| 7,088,763 B2 * | 8/2006 | Jensen et al. | 375/324 |
| 7,286,009 B2 * | 10/2007 | Andersen et al. | 330/10 |
| 7,310,386 B2 * | 12/2007 | Jensen et al. | 375/316 |
| 7,373,143 B2 * | 5/2008 | Dygert | 455/418 |
| 7,404,074 B2 * | 7/2008 | Murotake | 713/100 |
| 7,466,975 B2 * | 12/2008 | Feher | 455/404.2 |
| 7,561,881 B2 * | 7/2009 | Feher | 455/440 |
| 7,646,792 B2 * | 1/2010 | Arsenault et al. | 370/477 |
| 7,826,810 B2 * | 11/2010 | Carmel et al. | 455/127.2 |
| 7,974,246 B1 * | 7/2011 | Fulthorp et al. | 370/337 |
| 2002/0111149 A1 * | 8/2002 | Shoki | 455/277.1 |
| 2002/0168951 A1 * | 11/2002 | Paulus et al. | 455/130 |
| 2003/0050055 A1 * | 3/2003 | Ting et al. | 455/419 |
| 2003/0091127 A1 * | 5/2003 | Jensen et al. | 375/324 |
| 2005/0010958 A1 * | 1/2005 | Rakib et al. | 725/111 |

(Continued)

OTHER PUBLICATIONS

L. Pucker, Channelization Techniques for Software Defined Radio, Proceedings of SDR Forum Technical Conference, Orlando, 2003, pp. 1-6.*

(Continued)

*Primary Examiner* — Faruk Hamza
*Assistant Examiner* — Christopher Crutchfield
(74) *Attorney, Agent, or Firm* — Thompson & Knight LLP; James J. Murphy

(57) ABSTRACT

A radio system including a selected number inputs for substantially simultaneously receiving radio signals in different frequency bands and a selected number of conversion paths for converting the radio signals received at corresponding ones of the inputs into a corresponding number of digital streams. Digital processing circuitry substantially simultaneously processes digital samples for plurality of channels, the samples taken from at least one of the digital streams, wherein a maximum number of channels is greater than a maximum number of digital streams provided by the conversion paths.

11 Claims, 4 Drawing Sheets

U.S. PATENT DOCUMENTS

| | | | |
|---|---|---|---|
| 2005/0207515 A1* | 9/2005 | Jensen et al. | 375/327 |
| 2005/0286619 A1* | 12/2005 | Haddadin et al. | 375/222 |
| 2006/0015674 A1* | 1/2006 | Murotake | 711/101 |
| 2006/0119493 A1* | 6/2006 | Tal et al. | 341/143 |
| 2006/0154629 A1* | 7/2006 | Zahm et al. | 455/136 |
| 2006/0199550 A1* | 9/2006 | Ishikawa et al. | 455/84 |
| 2006/0234691 A1* | 10/2006 | Dygert | 455/418 |
| 2007/0032266 A1* | 2/2007 | Feher | 455/553.1 |
| 2007/0152750 A1* | 7/2007 | Andersen et al. | 330/136 |
| 2007/0259628 A1* | 11/2007 | Carmel et al. | 455/127.1 |
| 2007/0293160 A1* | 12/2007 | Gupta et al. | 455/78 |
| 2008/0031388 A1* | 2/2008 | Rabbath et al. | 375/346 |
| 2008/0170853 A1* | 7/2008 | Rakib et al. | 398/26 |
| 2011/0075641 A1* | 3/2011 | Siriwongpairat et al. | 370/337 |

OTHER PUBLICATIONS

F. Raffaeli, Low Cost Direct I.F. Digital Demodulator for AM, FM and Digital Broadcasts, as archived by the Internet Archive, www.archive.org, on Jul. 18, 2004, pp. 1-6.*

R. Hosking, Field Programmable Gate Arrays for Software Radio, Pentek Publication, as archived by the Internet Archive, www.archive.org, on Oct. 31, 2005, pp. 1-2.*

T. Hollis, Digital Down Converter Demo/Framework for HERON modules with FPGA, Hunt Engineering Publication, as archived by the Internet Archive, www.archive.org, on Sep. 24, 2005, pp. 1-34.*

C. Dick, Implementation of FPGA Signal Processing Datapaths for Software Defined Radio, Proceesings of Communications Design China, 2001, pp. 241-247.*

* cited by examiner

MULTIPLE-CHANNEL SOFTWARE DEFINED RADIOS AND SYSTEMS USING THE SAME

FIELD OF INVENTION

The present invention relates in general to wireless communications techniques, and in particular to multiple-channel software defined radios and systems using the same.

BACKGROUND OF INVENTION

In any transportation industry, reliable communications systems are mandatory for avoiding serious, if not catastrophic, accidents. In the particular case of the railroads, the railroad central offices normally communicate through wired telecommunications links with a network of radio base stations, which are typically dispersed over very large geographical areas. The radio base stations in turn maintain wireless communication links with locomotives, service vehicles, and wayside systems operating within the base station coverage areas.

In designing and operating a communications system for a transportation industry, a number of different constraints must be addressed. In the railroad industry, for example, a reliable and efficient communications system must be capable of handling different types of information, including data transmitted from the railroad central office and wayside systems to the locomotive on-board computers, as well as voice transmissions between train crews and the central office. In addition, any wireless communications system must conform with the restrictions imposed on it by the Federal Communications Commission (FCC), for example, those related to frequency band allocation, channel width and spacing, and so on. Finally, any commercially viable communications system should be adaptable to meet new needs and challenges as they arise.

SUMMARY OF INVENTION

The principles of the present invention are embodied in multiple-channel software defined radios and systems using the same. According to one particular embodiment, a radio system is disclosed that includes a selected number inputs for substantially simultaneously receiving radio signals in different frequency bands and a selected number of conversion paths for converting the radio signals received at corresponding ones of those inputs into a corresponding number of digital streams. Digital processing circuitry substantially simultaneously processes digital samples for plurality of channels, the samples taken from at least one of the digital streams, wherein a maximum number of channels is greater than a maximum number of digital streams provided by the conversion paths.

Embodiments of the present principles include digital radios that allow multiple channels of information to be received on one or more radio frequency bands, converted into digital samples, and then simultaneously demodulated. For simultaneous reception of multiple information channels on multiple frequency bands, multiple analog to digital conversion paths are provided for generating multiple streams of digital samples, from which samples for particular channels can be extracted for simultaneous processing and demodulation. In one particular embodiment, the number of information channels that may be simultaneously processed is greater than the number of radio frequency bands on which those information channels are being received.

Furthermore, according to the principles of the present invention, certain digital processing operations, normally performed in a digital signal processor or similar subsystem, are off-loaded to circuitry embodied in a field programmable gate array. Advantageously, the task load on the digital signal processor is substantially reduced.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
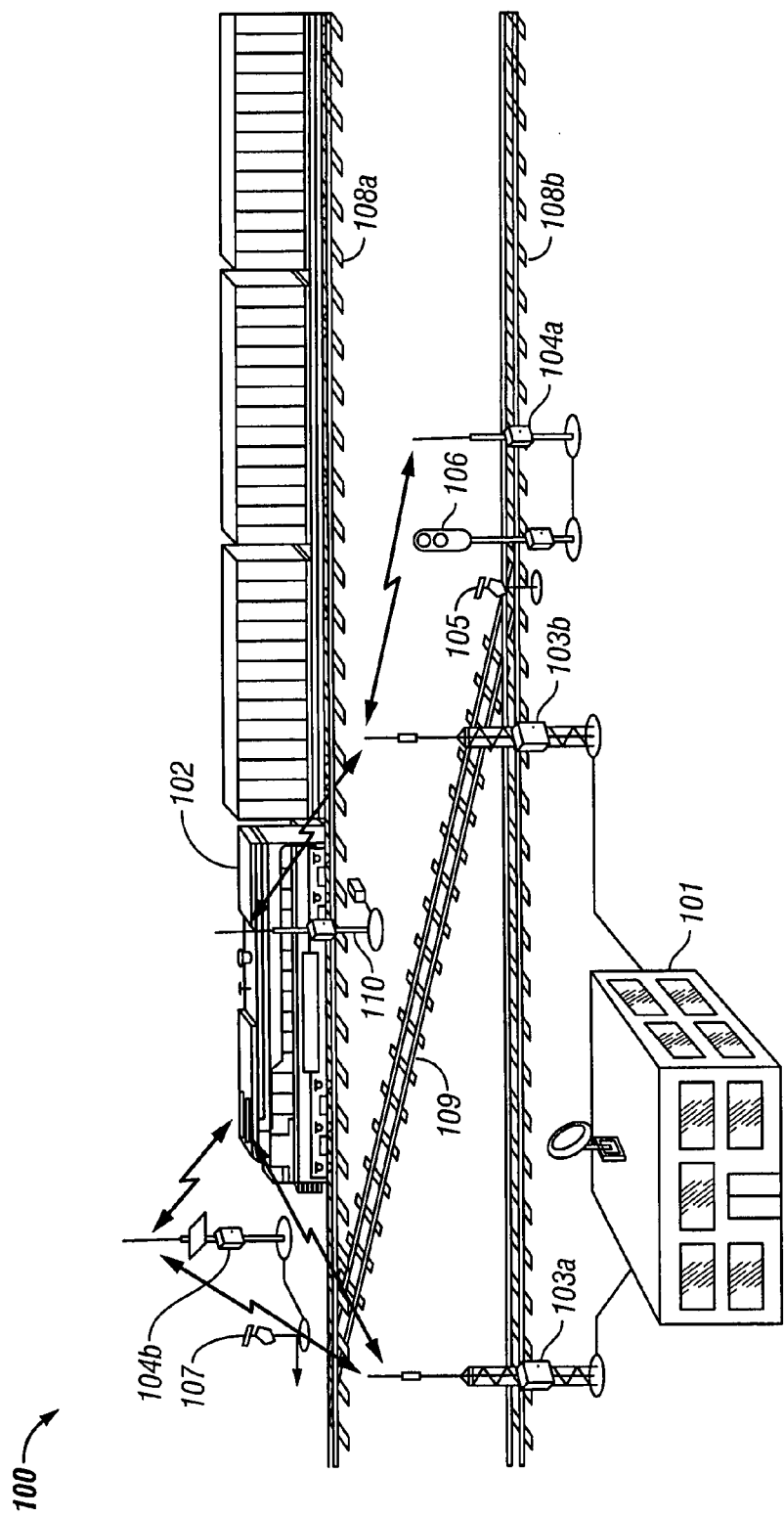
FIG. 1 is a high level block diagram of a small portion of a representative communications system utilized in the railroad industry and suitable for describing a typical application of the present inventive principles.

The principles of the present invention and their advantages are best understood by referring to the illustrated embodiment depicted in FIGS. 1-2 of the drawings, in which like numbers designate like parts.

FIG. 1 is high level diagram showing a small portion of a railroad communications system 100 embodying the principles of the present invention. Generally, system 100 supports wireless communications between a central office (network operating center) 101 and locomotives 102 located at various points around a rail system, as well as direct communications between locomotives 102 and the electronic wayside monitoring subsystems, discussed below in detail.

In communications system 100, central office 101 communicates with packet data radios on locomotives 102 through a wired telecommunications network and a series of packet radio base stations dispersed over thousands of square miles of geographical area through which the rail system operates. In the diagram of FIG. 1, two radio base stations 103a and 103b are shown for discussion purposes.

Communications system 100 also includes a series of wayside monitoring subsystems, which monitor wayside systems such as signals, switches, and track circuits and communicate the monitored information directly to locomotives 102 within the corresponding wireless coverage area, as well as to central office 101 though base stations 103. FIG. 1 shows two representative wayside monitoring subsystems 104a and 104b. As examples of typical uses of wayside monitoring subsystems 104, wayside monitoring subsystem 104a is shown monitoring a switch 105 and a three-lamp signal 106, and wayside monitoring subsystem 104b is shown monitoring a hand-throw switch 109. Also for illustrative purposes, two parallel sections of track 108a and 108b and a connecting section 109 are shown in FIG. 1, which represent only a very small part of the overall track system.

Communications system 100 also includes a hotbox monitoring subsystem 110 which uses rail-side sensors to allow central office 101 to monitor the axle status of passing trains through packet data radios and wireless base stations 103. In particular, railcar wheels, brakes, and trucks can be monitored for stuck brakes or overheated bearings, such that trains can be slowed or stopped before a catastrophic failure occurs.

Figure 2A:
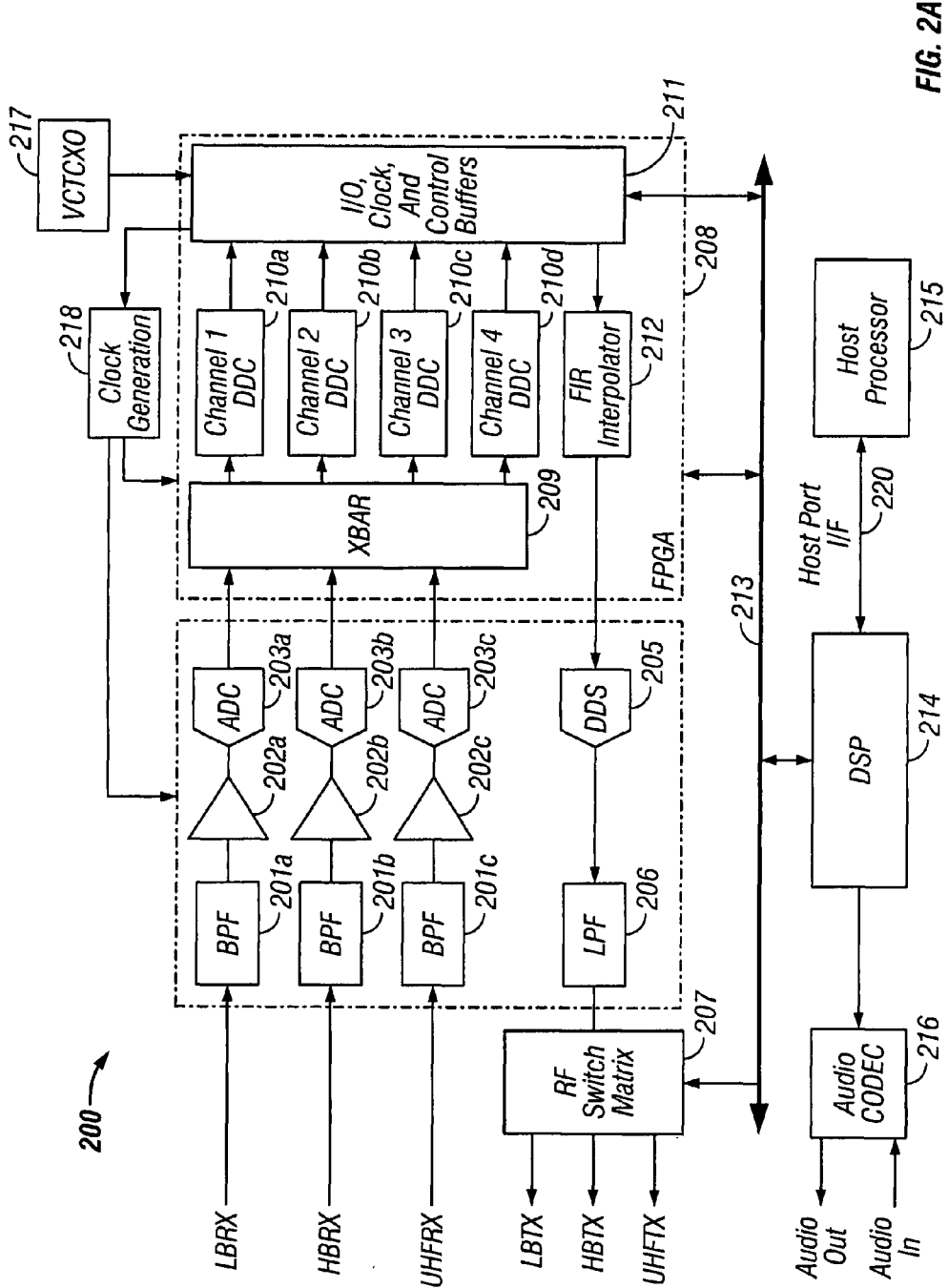
FIG. 2A is a block diagram of the primary operational blocks of a representative software defined radio (SDR) embodying the principles of the present invention.

FIG. 2A is a block diagram of a multiple-channel software defined radio (SDR) embodying the principles of the present invention. Among other things, SDR 200 realizes the significant advantage of allowing multiple information (voice and data) channels to be simultaneously received on multiple radio frequency (RF) input bands and then simultaneously demodulated using multiple parallel data processing paths. Particularly advantageous is the fact that these data channels can have different frequencies, channel spacing, modulation types, and bit rates. In other words, SDR 200 performs multiple simultaneous receive operations typically requiring a corresponding number of single-channel receivers. Furthermore, SDR 200 also supports simplex data transmission on a selected transmission channel and RF frequency band.

SDR 200 is suitable for use in a wide range of radio communications applications requiring the simultaneous or near simultaneous exchange of multiple channels of information in multiple formats, such as digital data and voice. In exemplary system 100 of FIG. 1, SDR radio 200 may be used in base stations 103, locomotives 102, and wayside monitoring subsystems 104.

In the illustrated embodiment, SDR 200 receives and transmits data on three (3) RF frequency bands. The receive bands include the low receive (LBRX) band (approximately 39-50 MHz), the high receive (HBRX) band (approximately 151-163 MHz), and the ultra high frequency receive (UHFRX) band (approximately 935-940 MHz). The high receive (HBRX) band may be partitioned into receive sub-bands, for example, two sub-bands of approximately 151-156 MHz and approximately 156-163 MHz.

The transmit bands include the low transmit (LBTX) band (approximately 39-50 MHz), the high transmit (HBTX) band (approximately 151-163 MHz), and the ultra high frequency transmit (UHFTX) band (approximately 896-940 MHz). The high transmit (HBTX) band may be partitioned into transmit sub-bands, for example, two sub-bands of approximately 151-156 MHz and approximately 156-162 MHz. The high frequency transmit (UHFTX) band may also be partitioned into sub-bands, for example, two sub-bands of approximately 896-901 MHz and approximately 935-940 MHz.

In alternate embodiments, the number of RF receive and transmit bands, as well as the corresponding frequencies, may differ depending on the particular design or application.

As shown in FIG. 2A, the receive bands (LBRX, HBRX, UHFRX) are each provided with an independent hardware path including an analog bandpass filter (BPF) 201*a*-201*c*, an intermediate frequency (IF) amplifier 202*a*-202*c*, and an analog to digital converter (ADC) 203*a*-203*c*. In the illustrated embodiment, BPFs 201*a*-201*c* have a passband of approximately 39-90 MHz, IF amplifiers 202*a*-202*c* provide approximately 21 dB of gain with bypass, and ADCs 203*a*-203*c* operate at a sampling rate of 57.6 Msps and have an output resolution of fourteen (14) bits. (Front end modules [not shown] perform low-noise amplification and down-convert signals received on the HBRX and the UHFRX bands into the 39-90 MHz IF bands at the inputs to BPFs 201*b* and 201*c*). Filters 201*a*-201*c* reduce spurious noise generated elsewhere in the system and suppress energy that would otherwise be sampled outside the first two (2) Nyquist zones. IF amplifiers 202*a*-202*c* improve the noise figure at the inputs to ADCs 203*a*-203*c*. The particular receive hardware parameters may change based on the specific design and application of SDR 200.

The RF transmit path includes a direct data synthesizer (DDS) 205, which performs digital sinusoidal carrier frequency generation and digital to analog conversion, and an analog lowpass filter (LPF) 206. In the illustrated embodiment, LPF 206 has a corner frequency of approximately 90 MHz and passes signals in the 39-90 MHz IF band to an RF switch matrix 207. RF switch matrix 207 switches the IF signals to corresponding transmit modules (not shown), which generate the ultimate RF signals within the appropriate RF transmit band (LBTX, HBTX, UHFTX).

According to the principles of the present invention, SDR 200 is based upon a field programmable gate array (FPGA) 208, which may be, for example, an Altera EP2C35 FPGA. Generally, FPGA 208 and accompanying firmware act as a multi-channel receiver tuner and transmit modulator interpolator. FPGA 208 implements, for example, signal routing, channel turning, frequency down conversion, gain control, and CORDIC rotation (Cartesian to polar conversion) independently and simultaneously on multiple input channels.

As shown in FIG. 2A, FPGA 208 implements a cross-bar switch 209, which routes up to four (4) input channels provided by the three (3) receive paths. The four (4) channels of data are processed by four (4) corresponding direct data converters (DDCs) 210*a*-210*d*, which will be discussed in detail in further conjunction with FIG. 2B. Any or all of the four (4) DDCs 210*a*-210*b* can be routed to any one of the three (3) sampled RF receive bands (LBRX, HBRX, UHFRX). The simultaneous processed channels can be made up of data channels, voice channels, or a combination of voice and data. Additionally, each channel can be set for different channel frequency and spacing, modulation type, and bit rate, for example, 9600 bps GMSK data in a 12.5 kHz channel, voice in a 25 kHz channel, 19200 bps GMSK data in a third 25 kHz channel, and 9600 bps C4FM data in a 6.25 kHz fourth channel.

The DDC output vectors from each DDC 210*a*-210*d* include Cartesian (I and Q), along with magnitude, phase, and instantaneous frequency, which support data and voice demodulators operating on polar data. The outputs from DDDs 210*a*-210*d* are stored in registers within I/O, Clock, and Control Buffers circuit block 211, also implemented within FPGA 208. For the transmit path of SDR 200 (buffers), FPGA 208 implements a finite impulse response (FIR) interpolator 211.

FPGA 208 operates in conjunction with a bus 213 and digital signal processor 214. In the illustrated embodiment, DSP 214 is a Texas Instruments TMS320C5510 DSP, which supports multiple channel demodulation operations, as defined in firmware. DSP 214 also runs digital signal coding for forward error correction (FEC) and privacy, and can support digital voice decoding using commercially available vocoder firmware applications. Advantageously, SDR 200 redistributes the computational load between FPGA 208 and DSP 214 such that a large portion of the high speed DSP processing typically found in existing radio receivers, for example CORDIC rotation and frequency differentiation, is now implemented in FPGA 208.

A direct memory access (DMA) system implemented with DSP 214 enables the transfer and buffering of blocks of data samples between buffers within buffers block 211 and the DSP memory space. For example, when a prescribed block length of receive data processed by a DDC 210*a*-210*d* has been collected within buffer, DSP 214 retrieves those data blocks using DMA and performs the balance of the data or voice demodulation tasks. DSP 214 then outputs from one (1) to four (4) user data streams to host processor 215 via host port interface 220. One (1) of those data streams can be a voice channel routed to an audio codec 216 after preprocessing by DSP 214. Audio codec 216 emits an analog voice audio signal.

Host processor 215 downloads the boot code configuring FPGA 206 and DSP 214. Advantageously, boot downloading can be performed before or after field deployment of SDR 200, and allows field code upgrades to the FPGA, DSP, and host operating systems.

A voltage controlled temperature compensated crystal oscillator (VCTCXO) 217 establishes the time base for the circuitry of SDR 200. In the illustrated embodiment, VCTXO 217 generates a 19.2 MHz clock signal, which is level shifted and buffered within FPGA 208 and then provided to DSP 214 as the master clock (MCLK) signal. This clock signal is also provided as a reference signal to clock generation circuitry 218. Clock generation circuitry 218 includes a 921.6 MHz frequency synthesizer, for example a National Semiconductor LMX2531 frequency synthesizer, along with frequency dividers and level shifters. Clock generation circuitry 218 provides a set of clock signals, and in particular, a 57.6 MHz clock signal for driving ADCs 203a-203c, as well as the clock signals needed by DDS 205 and DDCs 210a-210d.

Figure 2B:
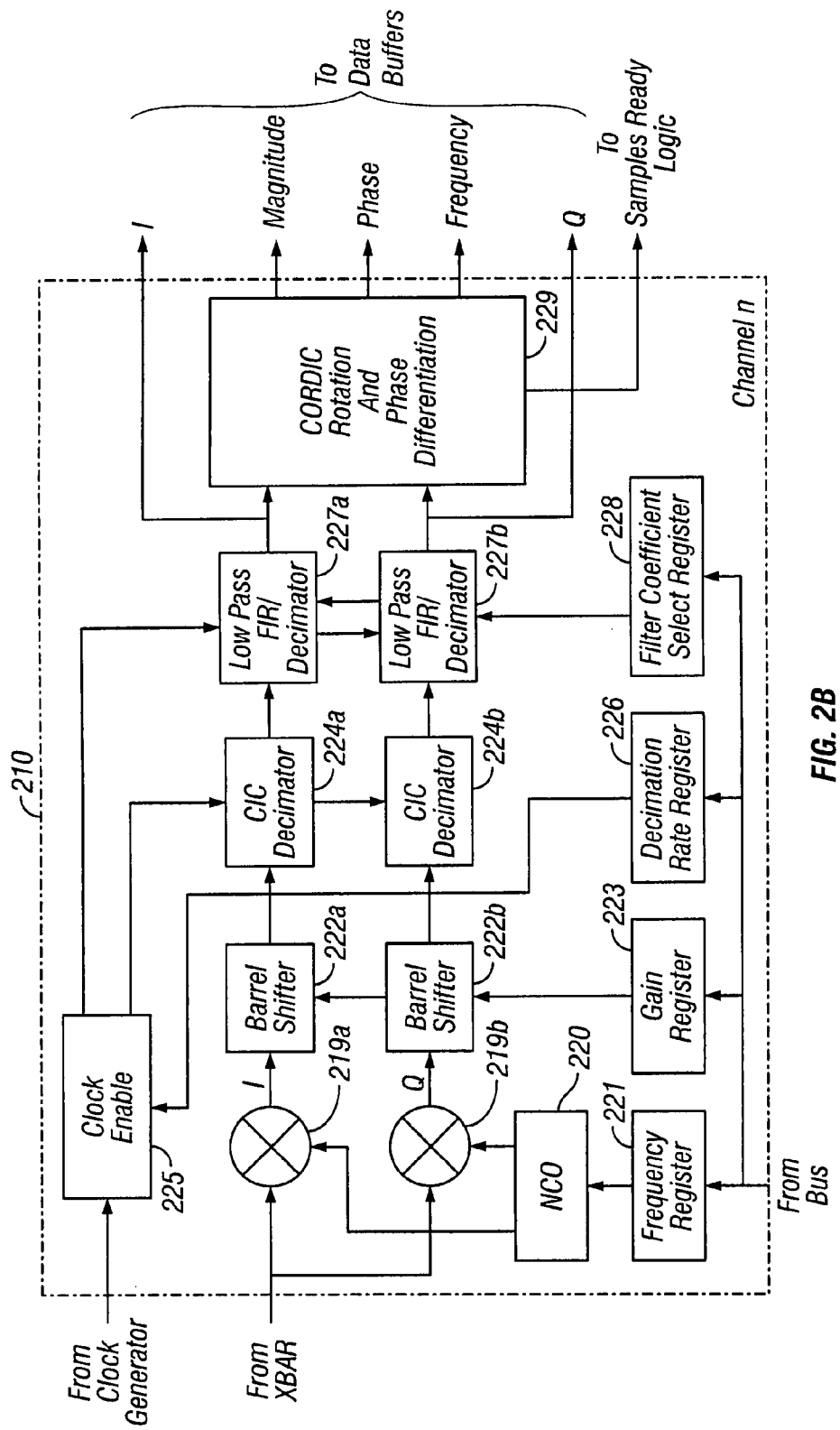
FIG. 2B is a more detailed block diagram of a selected one of the direct data converters (DDC) shown in FIG. 2A.

FIG. 2B is a more detailed block diagram of a selected one of DDCs 210a-210d of FPGA 208. As shown in FIG. 2B, digital mixers 219a and 219b, which are driven by numerically controlled digital oscillator (NCO) 220, generate in-phase (I) and quadrature (Q) signals from the input data received from crossbar switch 209. NCO oscillator is controlled by frequency control data loaded into frequency register 221. Frequency register 221, gain register 223, decimation rate register 226, and filter coefficient register 228 are loaded from bus 213 by DSP 214. In the illustrated embodiment, host 215 sends DSP 214 digital receive and transmit values in Hz, which are then validated and converted into appropriate numerical values, and then stored in the corresponding register. (In alternate embodiments, host 215 may directly the load registers within FPGA 208 using the DSP DMA system.)

The I and Q signals are shifted in barrel shifters 222a-222b, under the control of data stored within gain register 223. Generally, barrel shifters 222a-222b selectively shift the bits of each value output from the corresponding mixer 221a-221b to double the digital gain for each bit shifted (with sign bits maintained in their current states).

The I and Q signals are then filtered and decimated by corresponding cascaded integrator-comb (CIC) filters 224a-224b, under the control of clock enable signals generated by clock enable circuit block 225 and the data loaded into decimation rate register 226. In the preferred embodiment, where the input data stream is received at 57.6 Msps, CIC filters 224a-224b decimate by 1200 in response to 48 kHz clock enable signals.

After decimation, the I and Q data streams are lowpass filtered and further decimated by lowpass filters (LPFs) 227a and 227b, also enabled by clock enable block 221. The FIR filter coefficients are selected through filter coefficient select register 228. In the preferred embodiment, LPFs 227a and 227b are 200-tap FIR filters that implement a cutoff frequency of 6 kHz. The decimated and filtered I and Q samples are then sent to buffers within buffers block 211 of FIG. 2A for collection into blocks for use in signal demodulation by DSP 214.

Each DDC 210a-210d also includes CORDIC rotation and phase differentiation circuitry 229, which generates digital magnitude, phase, and instantaneous frequency information. This feature advantageously supports demodulation algorithms running on DSP 214 that utilize polar data.

During data transmission processing, data packet bits received by DSP 214 through host port 220 from host processor 215 are converted to bipolar format and then passed to buffers within FPGA 208. FPGA 208 then performs pre-modulation FIR filtering (e.g. Gaussian for GMSK modulated data) and interpolation within FIR interpolating filter block 212. The resulting data are combined with the carrier frequency data and sent to DDS 205 for conversion into analog form and ultimate transmission as an RF signal.

For analog voice transmission, voice samples received by DSP 214 from voice Codec 216 are preprocessed prior to delivery to FPGA 208. In the illustrated embodiment, DSP 214 implements analog voice processing operations including pre-emphasis filtering, amplitude limiting, and a FIR filtering for voice frequency band limiting.

As discussed above, the DSP implemented functions, for example GMSK modulation and demodulation, generate or operate on blocks of samples that are contained in sample buffers within buffers block 211 of FPGA 208. These sample buffers are maintained by the DSP DMA system. Generally, the DSP DMA and hardware interrupt system services sample buffers for transferring data to and from DSP 214 to peripherals, such as FPGA 208. In the preferred embodiment, the DMA system supports up to six (6) simultaneously active DMA channels, allocated as four (4) receive channels, one (1) transmit channel, and one (1) audio channel.

In particular, the DMA system generates a real time interrupt when a new block of samples is ready (in the receive mode) or data are needed (in the transmit mode) for processing by DSP 214. Generally, the interrupt rate is derived from the system clock and is integrally related to the sampling frequencies, which can range from two (2) to ten (10) times the bit rate of the data stream being processed. In the case of transmission processing, the sample buffers are at the output of the signal processing chain, while during reception processing, the sample buffers are at the input of the signal processing chain.

Receive and transmit band and channel control is implemented by a set of tables accessed by DSP 214 and populated by host processor 215 on system start-up. The channel palette defines, in the preferred embodiment, up to twenty one (21) receive and transmit frequency pairs, along with the modulation parameter value that selects modulation type, FCC designated channel spacing, and bit rate. A channel palette validate routine validates the channel palette contents at system start up and whenever called by host processor 215 after a channel palette change. Generally, valid and invalid receive channels are marked, with the corresponding transmit channel of the pair similarly assumed valid or invalid. Unused channels are indicated by zeros.

A channel assignment table, which is a subset of the channel palette, identifies up to four (4) active assigned receive channel numbers from the validated channel palette. The active assigned channels tune DDCs 210a-210d.

For signal reception on the four (4) assigned receive channels, four (4) corresponding sets of dual sample receive buffers are established in buffers block 211 of FPGA 208. Each pair of buffers stores either the I and Q output data or the phase, magnitude, and instant frequency output data generated by the associated DDC 210a-210d. In a ping-pong fashion, one dual sample buffer is filled by the DMA system while the other dual sample buffer is accessed to provide a sample block to the appropriate DSP demodulator routine. Whenever a sample block buffer is filled, a DMA interrupt occurs and its service routine moves the ping-pong buffer pointer(s) to the alternate buffer of the pair.

During voice operations, audio data samples are transferred by DMA between audio codec 216 and one of a pair of ping-pong audio sample buffers. Specifically, a single ping-pong buffer pair is used to transfer modulation samples from DSP 214 to FPGA 208 while the transmitter is keyed. FPGA 208 then accesses samples from one buffer and when that buffer is empty, the DMA system requests a new sample block from DSP 214 via an interrupt.

In the illustrated embodiment, host processor 215 can initiate transmission on one (1) active transmit channel defined in the channel assignment table. Specifically, a transmit key command, which indicates which of the assigned channels to transmit on, initiates a transmit operation. A receive stop routine interrupts reception on the selected channel. The corresponding modulation routine (e.g. GMSK, C4FM) being run by DSP 214 is initiated, along with activation of the required RF transmit circuits (not shown). A transmit state machine within FPGA 208 is enabled, such that FGPA 208 begins to generate interrupts to DSP 214 to transfer data into the ping-pong transmit buffers. On data channels, either individual transmit packet bytes or the entire packet is transferred to DSP 214 from host processor 215 via host processor interface 220.

Tasks being executed by DSP 214 are put into a task buffer, with each task indicating that an incoming block of samples is ready for processing by the given modulation routine being executed or that the samples in the current transmit buffer have been expended. Once the oldest task is begun, it runs to completion before the next oldest task is called. In particular, the transmit DMA interrupt from FPGA 208 enters the DSP transmit data modulator task in the next available position in the task buffer. When the task loop calls it, the modulator subroutine runs using packet data bits as input. DSP 214, through the DMA system, fills one of the data transmit sample block ping-pong buffers, as its output and then returns to the task buffer to start the next task.

Generally, the baseband modulation routine running on DSP 214 implements data pre-coding. The resulting output samples are scaled to generate a precise frequency offset that is interpolated by a FIR pre-modulation filter and then added to the carrier frequency phase increment in FPGA 208. The phase increment information is used by transmit DDS 205 to generate the desired carrier frequency.

During transmit of analog voice, audio codec 216 quantizes the voice or audio tone input from a microphone (not shown) into 16-bit pulse code modulation (PCM) samples at a fixed rate of around 8 ksps. These samples are collected by the DMA system into audio sample blocks. The baseband voice processor implemented by DSP 214 provides audio pre-emphasis (band-limited differentiation), amplitude limiting (clipping), and lowpass band limiting to about 3 kHz. The resulting samples are scaled for proper frequency deviation and placed in one of the transmit block sample buffers for use by FPGA 208.

During reception, if the desired reception channel has a valid entry in the channel table, the channel is activated. The phase increment is calculated and sent to FPGA 208 and the appropriate demodulation routine on DSP 214 is initiated. The applicable RF front end circuitry (not shown) is energized and initialized, as required. The DMA channel for the assigned DDC 210*a*-210*d* within FPGA 208 is also initialized and the DMA appropriate block interrupt is enabled. The DMA block interrupt, which is at the sample block rate, then controls transfer of sample blocks from FPGA 208 to DSP 214.

An interrupt service routine enters receive tasks each time a complete block of either I and Q or magnitude, phase, and instantaneous frequency data has been received in the corresponding receive ping-pong buffer. When the receive task is called, the receive sample block is operated on by the demodulation subroutines running on DSP 214. As discussed above, DDCs 210*a*-210*d* advantageously relieve DSP 214 of the burden of channel filtering, automatic gain control, automatic frequency control, decimation, and CORDIC rotation.

For GMSK applications, for example, the given DDC 210*a*-210*d* generates magnitude, phase, and instantaneous frequency data, which are the equivalent of frequency discriminator (arctan) and magnitude signals generated from I and Q data. These discriminator samples are used by the GMSK detection functions implemented by DSP 214 to detect packet preamble, frequency error, bit timing, sync bits, and packet data bits. The data are then demodulated by DSP 214, formatted into bytes, then and put in an output buffer for collection by host processor 215.

Advantageously, the receive data demodulator subroutine functions are called using structured variables that carry variables unique to the assigned channel so that these routines may be reused by multiple channels operating simultaneously.

During analog voice reception, the discriminator sample blocks from the given DDC 210*a*-210*d* are passed through a de-emphasis filter (band-limited integrator). These PCM audio samples are put into a Codec output buffer and then delivered by the DMA system to the ADC and anti-alias low pass filter within audio codec 216. DSP 214 implements a separate high pass filter that selects only the high frequency noise output from the discriminator samples, performs amplitude detection, low pass filtering, and threshold detection. The result of the threshold detection is used as a voice audio output SINAD squelch decision for controlling audio gates downstream in the audio path.

Figure 2C:
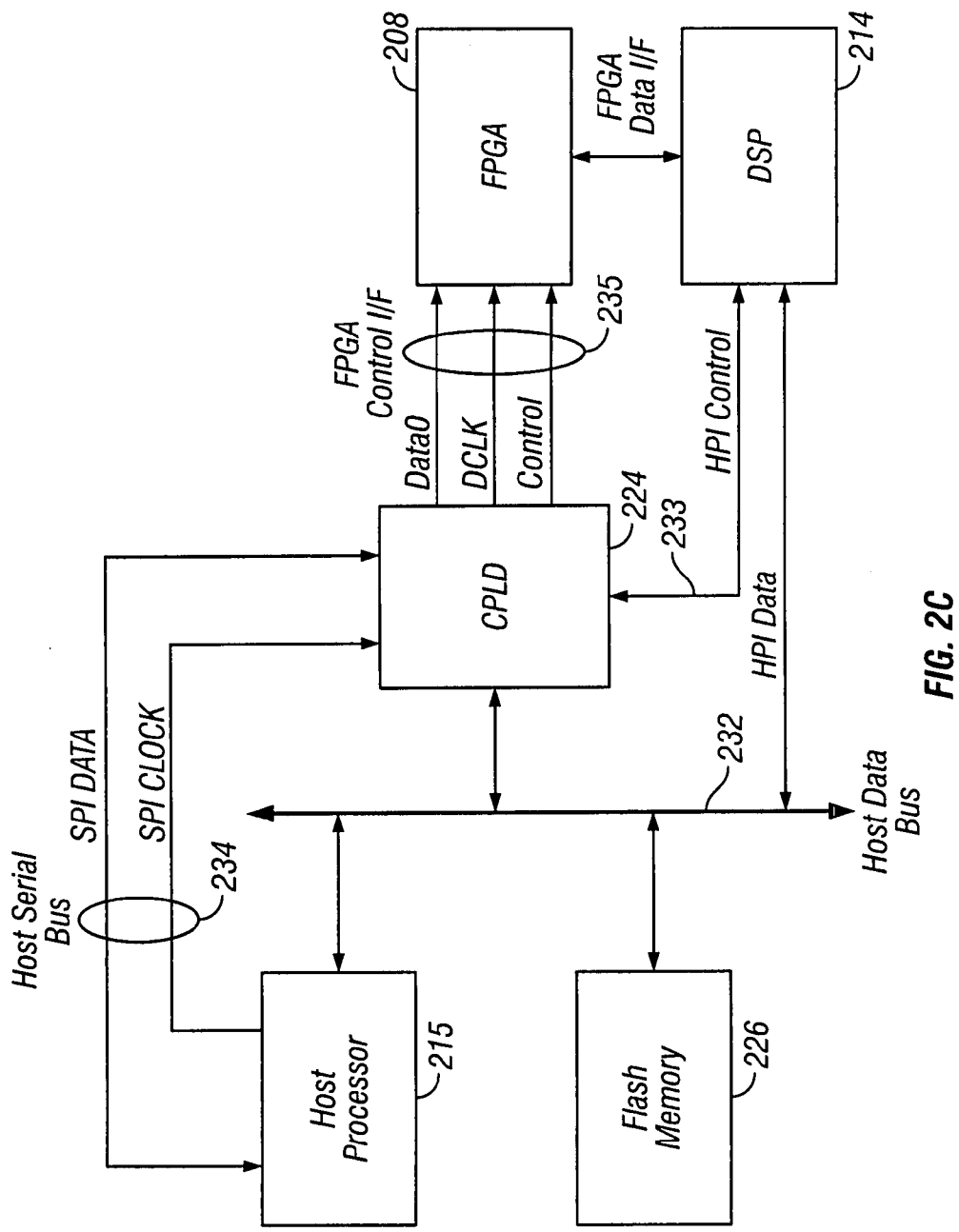
FIG. 2C is a block diagram of a representative architecture for booting the field programmable gate array (FPGA) and digital signal processor (DSP) shown in FIG. 2A.

FIG. 2C illustrates in further detail a preferred architecture for implementing the booting of FPGA 208 and DSP 214. In the embodiment shown in FIG. 2C, host interface 220 between host processor 215 and DSP 214 is implemented in part through a complex programmable logic device (CPLD) 231, such as an Altera EPM570 CPLD. In particular, control signals are exchanged between host processor 215 and DSP 214 through CPLD 231 and Host Processor Interface (HPI) control interface 233 and data are exchanged between host processor 215 and DSP 214 through host data bus 232. Host processor 215 also exchanges serial peripheral interface (SPI) data and a SPI clock signal with CPLD 221 across host serial bus 234. Boot code stored in Flash memory 230 is delivered to host processor 215 across host data bus 232.

In the illustrated embodiment, the boot process for SDR 200 is performed as follows. CPLD 231 self-boots at start-up from boot code stored within internal EEPROM. Host processor 215 enables the SPI at start-up and then transfers the FPGA boot code from Flash memory 230 to CPLD 231 via the host serial bus 234. In turn, CPLD 231 routes the FPGA boot code to FPGA 208 via the serial line Data° using the DCLK clock signal. Host processor 215 monitors the FPGA boot process for error detection and completion via host data bus 232. Following FPGA boot, host processor 215 boots DSP 214 via CPLD 231 and the host port interface.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A radio system comprising:
    a selected number of inputs for substantially simultaneously receiving radio signals in different frequency bands;
    a selected number of conversion paths for converting the radio signals received at corresponding ones of the inputs into a corresponding number of digital streams;
    a plurality of digital processing circuits implemented on a field programmable gate array for substantially simultaneously processing digital samples for a plurality of channels, the samples for each channel taken from a selected one of the digital streams, wherein a maximum number of channels is greater than a maximum number of digital streams, each digital processing circuit comprising:
        mixing circuitry for generating digital in-phase and quadrature sample streams from the samples for a corresponding channel;
        gain control circuitry for setting gain for the in-phase and quadrature sample streams;
        digital filtering circuitry for filtering the digital in-phase and quadrature sample streams, the digital filtering circuitry comprising:
            comb filters for filtering and decimating the in-phase and quadrature sample streams output from the mixing circuitry; and
            low pass finite impulse response filters for filtering and decimating the filtered in-phase and quadrature sample streams output from the comb filters; and
        Cartesian to polar rotation and phase differentiation circuitry for generating magnitude, phase, and instantaneous frequency information from the in-phase and quadrature sample streams;
    switching circuitry for switching the samples for each of the channels from a selected one of the digital streams to the corresponding data processing circuit; and
    a digital signal processor for demodulating a selected one of the in-phase and quadrature sample stream and the magnitude, phase, and instantaneous frequency information from a selected one of the plurality of digital processing circuits, wherein the digital signal processor selects between the in-phase and quadrature sample stream and the magnitude, phase, and instantaneous frequency information based on a modulation type of digital samples of the channel being processed by the selected one of the digital processing circuits, the digital signal processor selecting blocks of instantaneous frequency, magnitude, and phase information when the modulation type of the channel being demodulated comprises Gaussian Mean Shift Keying.

2. The radio system of claim 1, wherein:
    the inputs are operable to receive radio signals on low, high, and ultra high receive frequency bands;
    the conversion paths are operable to generate first, second, and third digital streams in response to radio signals respectively received on the low, high, and ultra high frequency bands; and
    the plurality of digital processing circuits comprise at least four digital processing circuits each operable to process samples for a corresponding one of at least four channels.

3. A digital radio comprising:
    analog to digital conversion circuitry for substantially simultaneously converting radio signals received on plurality of frequency bands into a plurality of sample streams; and
    a field programmable gate array comprising first and second processing paths for substantially simultaneously processing samples for first and second channels, the samples taken from at least one of the plurality of sample streams, wherein a maximum number of sample streams is less than a maximum number of channels and each of the first and second processing paths includes:
        mixing circuitry for generating streams of in-phase and quadrature samples for the associated channel;
        gain control circuitry for controlling gain of the streams of in-phase and quadrature samples;
        digital filtering circuitry for filtering each of the streams of in-phase and quadrature samples comprising:
            a comb filter for filtering and decimating the in-phase and quadrature sample streams output from the mixing circuitry; and
            a low pass finite impulse response filters for filtering and decimating the filtered in-phase and quadrature sample streams output from the comb filters; and
        Cartesian to polar rotation and phase differentiation circuitry for generating instantaneous frequency, magnitude, and phase information; and
    a digital signal processor for demodulating blocks of output information generated for each of the first and second channels by the first and second digital processing paths, the blocks of output information selected from the group consisting of blocks of in-phase and quadrature information and blocks of instantaneous frequency, magnitude, and phase information, wherein the digital signal processor selects between the blocks of in-phase and quadrature information and the blocks of instantaneous frequency, magnitude, and phase information based on a modulation type of the channel being demodulated, the digital signal processor selecting the blocks of instantaneous frequency, magnitude, and phase information when the modulation type of the channel being demodulated comprises Gaussian Mean Shift Keying.

4. The digital radio of claim 3, wherein the digital filtering circuitry includes at least one filter selected from the group consisting of comb filters and a finite impulse response filters.

5. The digital radio of claim 3, further comprising:
    a transmit processing path within field programmable gate array for processing digital data being transmitted by the radio; and
    direct digital synthesis circuitry for converting digital transmit data output from the field programmable gate array into analog form for transmission on a selected one of a plurality of radio frequency transmit bands.

6. The digital radio of claim 5, wherein the transmit processing path within the field programmable gate array comprises a finite impulse response filter for interpolating and filtering the transmit data.

7. The digital radio of claim 5, further comprising a digital signal processor for modulating the digital data being transmitted by the radio and delivering modulated data to the transmit processing path within the field programmable gate array.

8. A software defined digital radio system comprising:

a digital signal processor for demodulating sample blocks for a plurality of receive channels received on at least one selected frequency band, the sample blocks selected from the group consisting of blocks of in-phase and quadrature samples and blocks of, magnitude, phase, and instantaneous frequency samples;

a field programmable gate array including:

buffering circuitry for storing sample blocks for the receive channels being demodulated by the digital signal processor; and a plurality of receive processing paths each for processing input samples and in response generating for storage in the buffering circuitry the sample blocks for a corresponding one of the receive channels, each receive processing path including:

mixing circuitry for mixing the corresponding data samples with a local oscillator to generate in-phase and quadrature sample streams;

gain control circuitry for setting gain for the in-phase and quadrature sample streams output from the mixing circuitry;

a comb filter for filtering and decimating the in-phase and quadrature sample streams generated by the mixing circuitry after setting the gain;

a low pass finite impulse response filter for filtering and decimating the filtered in-phase and quadrature sample streams generated by the comb filters; and rotation and phase differentiation circuitry for generating magnitude, phase, and instantaneous frequency information from the filtered in-phase and quadrature sample streams generated by the low pass finite impulse response filters;

input switching circuitry for switching input data samples from at least one input sample stream to the plurality of receive processing paths;

analog to digital conversion circuitry for generating the at least one input sample stream from an analog input signal received on the at least one selected input radio frequency band, wherein the input switching circuitry and a number of the receive processing paths allows the sample blocks of the plurality of channels to be extracted from the at least one input sample stream and such that a maximum number of the receive channels processed by the digital signal processor is greater than a maximum number of digital streams generated by the analog to digital conversion circuitry; and wherein the digital signal processor selects between the blocks of in-phase and quadrature samples and the blocks of magnitude, phase, and instantaneous frequency samples based on a modulation type of the receive channel being demodulated, the digital signal processor selecting the blocks of magnitude, phase, and instantaneous frequency samples when the modulation type of the receive channel being demodulated comprises Gaussian Mean Shift Keying.

9. The software defined radio of claim 8, wherein:

the input switching circuitry is operable to substantially simultaneously switch input samples from a plurality of input streams to the plurality of receive processing paths; and the analog to digital conversion circuitry is operable to substantially simultaneously generate the plurality of input streams from a plurality of analog input signals of a plurality of selected input radio frequency bands.

10. The software defined radio of claim 8, wherein the digital signal processor is further operable to modulate data sample blocks for a transmit channel and the field programmable gate array further comprises:

buffering circuitry for storing modulated data sample blocks from the digital signal processor; and a transmit path for processing transmit data samples from the modulated sample blocks stored in the buffering circuitry for the transmit channel.

11. The software defined radio of claim 10, wherein the transmit path of the field programmable gate array comprises a finite impulse response filter for filtering and interpolating the transmit data samples.

* * * * *